INVENTORS
JOHN F. ROBINSON
ANTHONY S. SQUILLACE
BY
*Philip M. Hinderstein*
ATTORNEY

INVENTORS
JOHN F. ROBINSON
ANTHONY S. SQUILLACE
BY
ATTORNEY

United States Patent Office 3,525,889
Patented Aug. 25, 1970

3,525,889
METHOD OF BONDING LAMINATES AND IMPREGNATING THE WINDING ON A STATOR CORE AND PRODUCT THEREOF
John F. Robinson, Newport Beach, and Anthony Squillace, Cypress, Calif., assignors to North American Rockwell Corporation, a corporation of Delaware
Filed Feb. 10, 1967, Ser. No. 615,126
Int. Cl. C09g 3/00; H02k 3/32, 15/12
U.S. Cl. 310—45                                 4 Claims

ABSTRACT OF THE DISCLOSURE

A method (and product thereof) for bonding and impregnating composite electromechanical structures such as a gyroscope motor stator laminations and windings by coating, stacking, and pressing the laminations, adding windings, then vacuum drawing and curing, using a very low modulus of elasticity polyamide resin-epoxy mixture devoid of filler material.

BACKGROUND OF THE INVENTION

Field of the invention

The present invention relates to a method and means fod bonding and impregnating composite electromechanical structures and, more particularly, to a novel technique for integrating electromechanical structures which include laminations of magnetic materials, electrical windings, and impregnating materials for the purpose of obtaining maximum electrical, mechanical stability.

Description of the prior art

In numerous types of electromechanical structures, it is common to make use of composite structures of several different materials. For example, in the construction of devices such as motors, transformers, synchro-type devices, E-core pickoffs, resolvers, and null indicating devices, the basic constructional elements are laminations of magnetic materials, electrical windings, and impregnating materials. The lamination sections are first bonded together to form a unitary device incorporating a plurality of slots to receive the electrical windings. The windings are then formed and compressed and integrated with the laminates. Normally, the whole device is then impregnated using a rigid epoxy material.

All devices made in this manner suffer from a common problem. The structure includes several elements, each of which has a different coefficient of expansion. The laminated plates are usually made of steel which has a coefficient of expansion of approximately 6 p.p.m./F.°, the windings are made of copper which has a coefficient of expansion of approximately 9 p.p.m./F.° and the potting compounds, which are substantially plastics, have coefficients of expansion from 20 to 50 p.p.m./F.°. Since the coefficients are so far apart, it is inevitable that stresses will be induced within the structure with changes in temperature. Because of these built in stresses, there is a constant shifting of the mass within the composite structure. This shifting of the mass can continue for several years. In the beginning it is rather rapid and pronounced but then it slowly tapers off. This normal decay characteristic is called "trend." Trend is described as a slow mass shift. The amount of trend falls off asymptotically to a very small number but is rarely reduced to zero. In most applications, this slowly varying mass shift or trend is of no real significance. However, in the construction of precision instruments, such as in the construction of motor drives for gyroscopes and the like, these mass shifts are critical and limit the accuracy of the instrument. This is so because geometrical instruments, cuch as gyroscopes, are critically balanced and anything which changes the mass balance results in an unwanted torque which acts on the instrument. It has become very important, therefore, to eliminate these built in stresses or to at least minimize them to the greatest extent possible.

Many attempts have been made heretofore to minimize these mass shifts in precision instruments with varying degrees of success. At first, the entire instrument was investigated in order to pinpoint the source of the unbalances. Many precision gyroscopes are beryllium structures, a highly stable material. Over the years, many studies were made of the beryllium stability but that was found not to be the cause of the problem. Then studies were made of the cementing, absorption of material into adhesives and creep of adhesive but that was found not to be the cause of the problem. Investigations were made of the possibility of moisture getting into the beryllium, but that was found not to be the case. Gas transfer among beryllium, adhesive and gyroscope floatation fluids was studied but with no success. Finally, the problem was pinpointed to the composite structure of the motor drive and other electromechanical devices. The differences in coefficients of expansion indicated that this was a source of built in stress. The first thought was to reduce the differences between the coefficients of expansion of the various materials. Inorganics (such as chalk, calcium carbonate, etc.) were mixed into the potting compound to lower the coefficient of expansion. These materials have coefficients of from 2–5 p.p.m./F.° and when mixed with the epoxy, any desired coefficient, say 16–17 p.p.m./F.° can be obtained depending upon how much of the filler material is added. There is a limit to the amount that can be added since eventually the compound becomes insufficiently fluid. Even to get the coefficient of expansion down to 16 or 17, three quarters of the compound must be inorganic. In other words, there is a small amount of vehicle and a large amount of inert material. By reducing the coefficient of expansion, a hard, brittle material has been made out of the potting compound. In addition, the material is so stiff at room temperatures that it must be raised to a temperature above 200° F. in order for it to be handled. When a motor, for example, which has been impregnated with such material, is brought down to 130° F., a typical working temperature, there are about 100° F. of built-in stresses; and the stresses are effectively trapped and cannot get out. There is a strong semi-ceramic epoxy type material with built-in stresses and the rate at which the stresses are relieved by mass shifts is very low. The major part of research today, in order to continue the elimination of this problem, is in the direction of harder and harder potting compounds. However, none of these techniques have yet provided a satisfactory solution to the problem.

SUMMARY OF THE INVENTION

According to the present invention, the problem of built-in stresses in electromechanical composite structures is attacked and solved in an entirely different fashion then done heretofore. The solution of the problem is based on the recognition of an inherent flaw in the reasoning of the prior art systems. As stated previously, the built-in stresses were considered to stem from the fact that there was a great difference in the coefficients of expansion of the materials used in the construction of the laminated structure. An attempt was made to eliminate this difference by lowering the coefficient of expansion of the potting and bonding material. However, when the coefficient of expansion of the material is lowered, the modulus of elasticity of the material is simultaneously increased. The coefficient of expansion and the modulus of elasticity of a material are related inversely. That which has a low coefficient of expansion has a high modulus of elasticity and vice versa. In the past, the effect of the modulus of elasticity was ignored in order to effectively lower the coefficient of expansion. However, investigations performed on structures built using a potting compound having a low coefficient of expansion discovered that the materials were so hard and brittle that they would splinter and shatter upon application of force such as that encountered in grinding the inside diameter of the laminates. This indicated the presence of severe stresses. To eliminate these stresses, a new technique for constructing electrochemical structures has been formulated. A material has been selected for bonding and impregnating which has a very low modulus of elasticity and, accordingly, a high coefficient of expansion. This material is used in the bonding of the laminated plates to form the basic structure. After the copper windings are wound around the slots in the lamination, the same low modulus of elasticity compound is used to impregnate the entire structure. Finally, the curing of the entire structure is done at the working temperature of the instrument, approximately 130° F. Instead of taking weeks or months or even years for the structure to settle into a relatively stable condition, the mass shifts now terminate after only a few days. In other words, a structure has been created which permits the several elements to shift to a neutral, stable position rapidly in order to relieve whatever stresses are built in in the formation of the structure. After only several days, the shifting essentially is completely and a highly stable structure results.

In essence, a complete about-face is being made. Instead of using a potting compound which is selected on the basis of it having a low coefficient of expansion, ignoring its modulus of elasticity, the potting compound is now selected on the basis of its having a low modulus of elasticity, ignoring its coefficient of expansion. By using a low modulus of elasticity material, if the structure is stored at room temperature and wants to shift to relieve the stresses, it may. Similarly, when the device is brought back up to its working temperature, the low modulus of elasticity permits it to recover its stable condition quickly.

OBJECTS OF THE INVENTION

It is, therefore, an object of the present invention to provide a process for bonding composite electromechanical structures.

It is a further object of the present invention to provide a process for impregnating composite electromechanical structures.

It is still a further object of the present invention to provide a novel impregnated composite electromechanical structure.

It is another object of the present invention to provide a novel impregnated composite electromechanical structure in which the encapsulating material has the ability to assume a compatible relationship with many dissimilar materials.

It is still another object of the present invention to provide a process for bonding and impregnating composite electromechanical structures in which a very low modulus of elasticity material is used for bonding and impregnating.

Another object of the present invention is the provision of a process for bonding and impregnating composite electromechanical structures in which the composite structure is cured at or near its working temperature.

Still other objects, features, and attendant advantages of the present invention will become apparent to those skilled in the art from a reading of the following detailed description of a preferred embodiment constructed in accordance therewith, taken in conjunction with the accompanying drawings wherein:

DESCRIPTION OF THE PREFERRED EMBODIMENT

Figure 2:
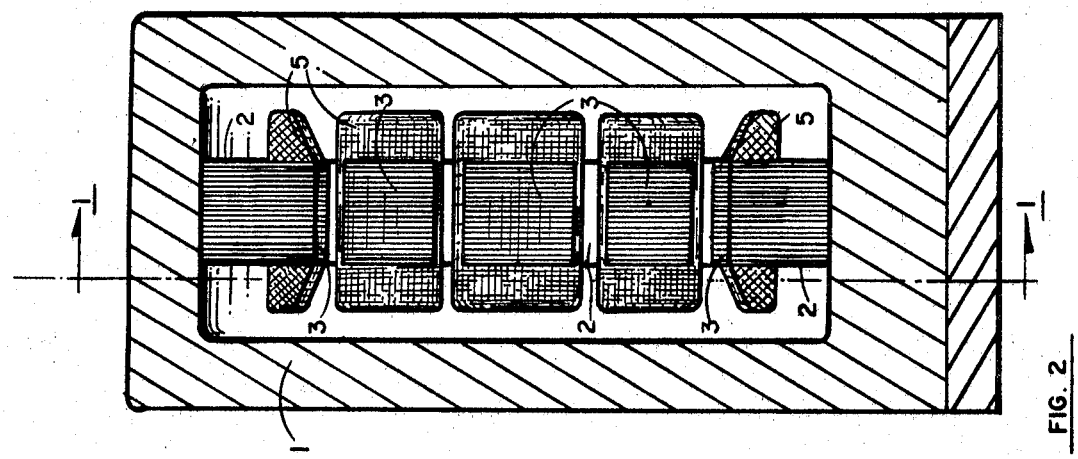
FIG. 2 is a cross-sectional view of the motor of FIG. 1 taken along lines 2—2 of FIG. 1.
Figure 1:
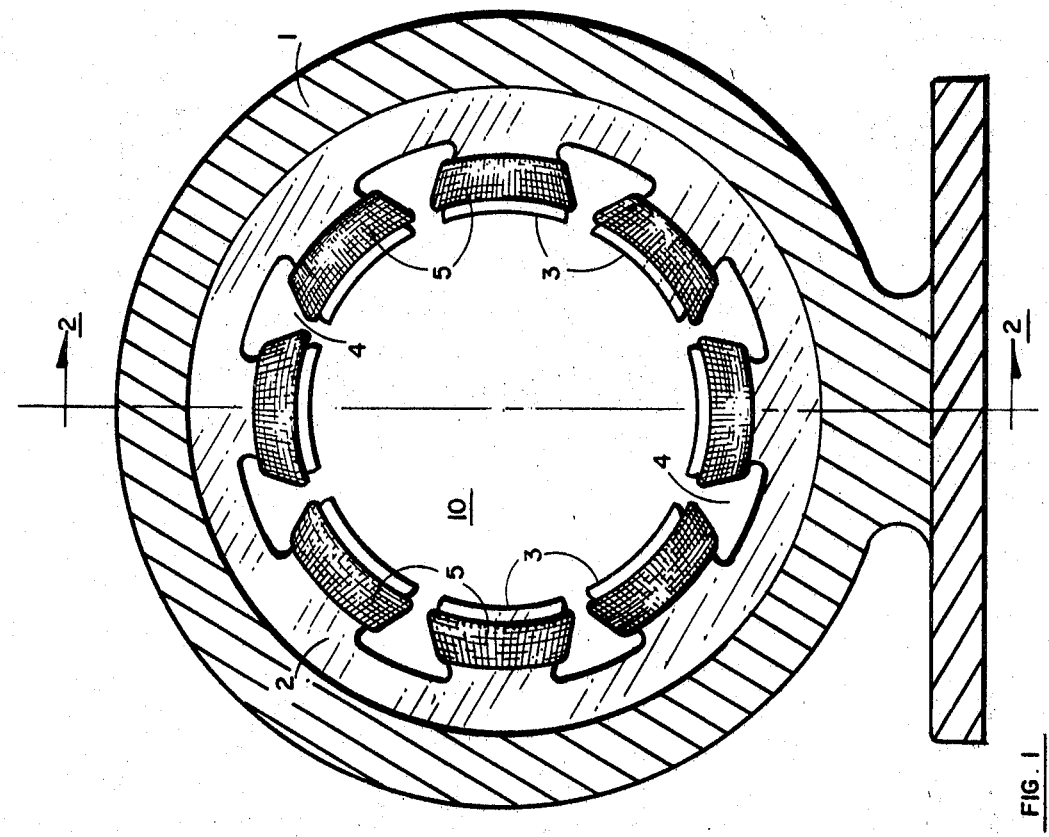
FIG. 1 is a cross-sectional view of a motor taken along lines 1—1 of FIG. 2.

Referring now to the drawings, and, more particularly, to FIG. 1 thereof, there is shown the construction of a typical motor stator 10 consisting of a housing portion 1 and a laminated structure of magnetic material 2. The laminated structure includes a plurality of tooth-like projections 3 which create a plurality of slots 4. The laminated structure 2 consists of a plurality of thin sheets of steel as can be seen more clearly in FIG. 2 which shows a cross-section of FIG. 1 taken along line 2—2 thereof. The individual laminates are bonded together using an epoxy material. After the laminates are bonded together, copper windings 5 are formed and placed in the slots 4 in the laminated structure. Typically, the entire motor structure is then potted using the same epoxy material.

The result is a composite structure, each element of which has a different coefficient of expansion. The laminated plates are usually made of steel which has a coefficient of expansion of approximately 6 p.p.m./F.°. The windings are typically made of copper which has a coefficient of expansion of approximately 9 p.p.m./F.°. The epoxy material used for potting typically has a coefficient of expansion of approximately 40 p.p.m./F.°. Since the coefficients of expansion of the different materials are so different, it was thought to be inevitable that stresses would be induced within the device. Such stresses would result in a constant shifting of the mass within the composite structure. In most applications, this slowly varying mass shift is of no real significance. However, in the construction of precision instruments, such as in the construction of gyroscopes, these mass shifts are quite critical and represent an effective limit on the accuracy of the instruments. Gyroscopes, as well as most all other geometrical instruments, require critical balancing of the component parts and mass shifts cannot be tolerated since they cause an unwanted torque on the output of the gyroscope. A typical gyroscope, together with a motor for spinning the rotor can be seen in U.S. Pat. 3,025,708 to John M. Slater et al. entitled "Free-Rotor Gyroscope Motor and Torquer Drives." In such a gyroscope, there is an output axis, an input axis and a spin axis. Mass shifts due to the construction of the drive motor cause torques to be developed about the output axis. When constructing a precision instrument, it is desired to keep all such torques to an absolute minimum. Anything that upsets the balance by changing the mass balances along an axis which is parallel to the spin axis results in a torque about the output axis. For the last six or seven years the biggest single limiting factor on these types of gyroscopes and, for that matter, any high precision gyroscope, is this sort of a torque due to mass shifts.

Figure 3:
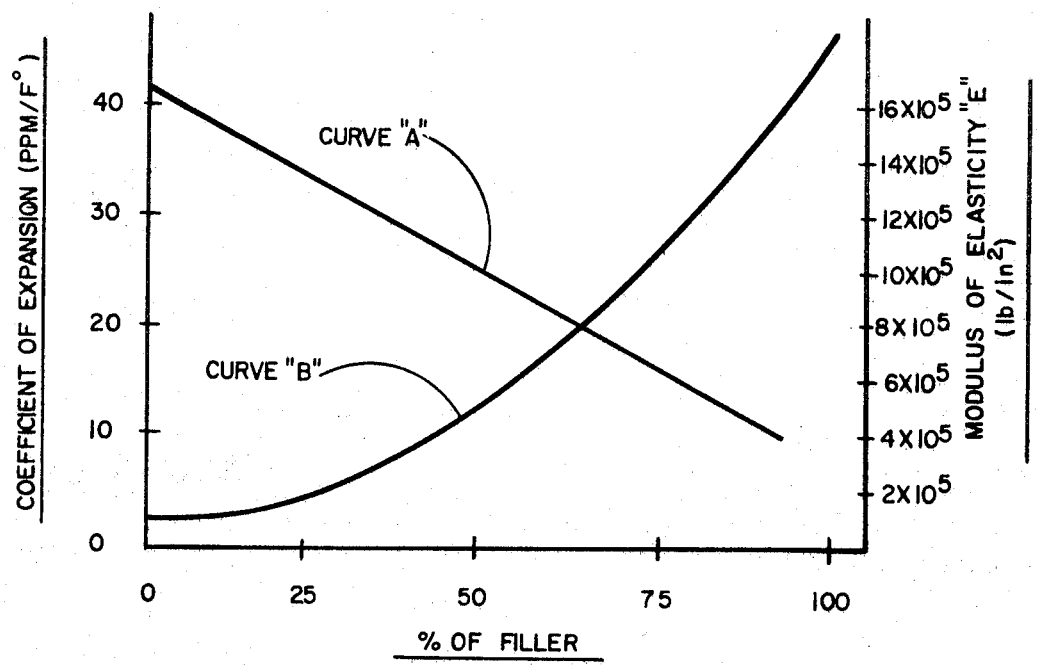
FIG. 3 shows a series of curves representing the coefficient of expansion and modulus of elasticity of various impregnating materials as a function of the percentage of filler in the material.

With reference to FIG. 3, the results of the prior art solutions to this problem of mass shifts may be seen. In FIG. 3, curve A shows the coefficient of expansion of typical impregnating materials as a function of the percentage of filler material added to the epoxy. Curve B shows how the modulus of elasticity of the plastic composition varies as a function of the percentage of filler. Steel and copper, which have high moduli of elasticity, have low coefficients of expansion. The plastic, however, when there is no filler added, has a coefficient of expansion of approximately 40 p.p.m./F.°. This can be seen from curve A. Its corresponding modulus of elasticity is relatively low, on the order of 100,000 p.s.i. as shown by curve B. In the prior art, an attempt was made to reconcile these differences in coefficients of expansion to reduce the distortions in the materials. Filler materials such as chalk, or calcium carbonate, with low coefficients of expansion were added to the epoxy to reduce the coefficient of expansion of the plastic. From curve B, however, it can be seen that as the coefficient of expansion is decreased by increasing the percentage of filler, the corresponding modulus of elasticity of the material increases. With a percentage of filler of about 75%, resulting in a coefficient of expansion of approximately 16 p.p.m. F., the modulus of elasticity has been increased to 1,200,000 p.s.i. These numbers vary systematically as a function of how much filler is added.

The trouble with an approach such as this can now be seen. By taking a relatively soft material with a very high coefficient of expansion and reducing the coefficient of expansion, the modulus of elasticity is increased creating a hard, brittle material. The filler now becomes the dominant material and controls the characteristic of the potting compound.

An additional factor should here be considered. At room temperatures, these heavily filled epoxy materials are stiff, almost like dough. In order for them to be molded, they must be heated to well over 200° F. After the instrument is cured at a temperature in excess of 230° F. and then brought down to 130° F., which is a typical working temperature, there are 100° F. worth of built-in stresses. But the stresses cannot be relieved. The epoxy material is strong, hard, and brittle and does not permit the shifting of the mass within the tructure to relieve the built-in stresses. As a result, the stresses remain trapped within the material for periods up in the years.

Figure 4:
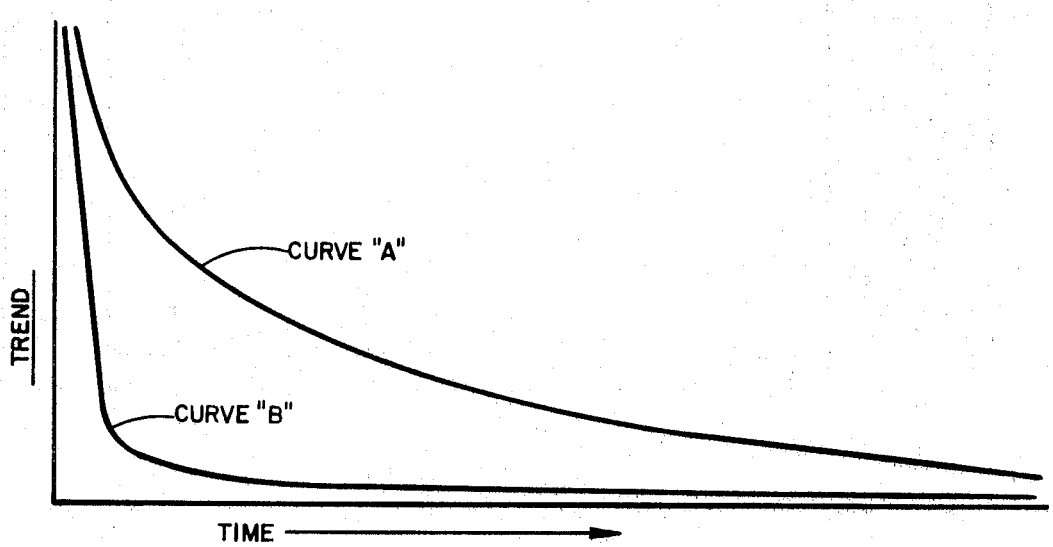
FIG. 4 shows curves of trend within composite structures as a function of time.

The normal decay characteristics of such a device is shown as curve A in FIG. 4. In FIG. 4, the abscissa is time and the ordinate is trend. Trend, as understood in a single degree of freedom gyroscope, means a slow mass shift along the spin axis of the gyroscope resulting in a torque about the output axis. The smaller the amount of trend the better. As can be seen from curve A, the amount of trend initially drops off rapidly but then slowly tapers off asymptotically to a fixed value which is greater than zero. It can be seen that as the requirements for more precise instruments have arisen, it will take longer and longer before an acceptable level of trend is reached. Presently, a gyroscope must be run for hundreds of hours to reduce the trend to an acceptable level. This represents a great loss of time, money, and performance.

According to the present invention, a new approach ot this problem has been formulated. It has been found, that the key factor in building a low stress motor with its associated low level mass shifts, is the lack of restraint of the impregnating material, or in other words, its ability to assume a compatible relationship with the dissimilar materials employed in the structure. In order to create such a compatible relationship, it has been found that it is necessary to use an impregnating material that has a low modulus of elasticity. With reference to FIG. 3, if an epoxy material is used no filler it would have a very high coefficient of expansion and a very low modulus of elasticity. Even though it runs contrary to what was always thought to be necessary, it has been found that it is exactly these properties which are necessary for the construction of a low stress motor. In fact, materials are now added to the epoxy to further lower the modulus of elasticity even though this increases the coefficient of expansion of the material. The low modulus of the impregnating material permits shifting of the masses within the composite structure and does not restrain the metals from motion. Also, by having a low modulus of elasticity the materials within the structure are permitted to freely move when the temperature is changed. In other words, if the instrument is stored at a temperature which is substantially different than its operating temperature, there will be a shifting of the mass within the instrument. However, when the instrument is brought back to its working temperature, it is necessary that it recover quickly to its original state. By providing the bonding material with a low modulus of elasticity, this is permitted.

Essentially, what is being done is that a material is taken with a low modulus of elasticity and a high coefficient of expansion. The same instrument, with the same core structure, laminates, slots, slot liners, and the same windings is taken and the whole package is put together using this new bonding material. The new material is first used as the bonding material, epoxy-polyamide, for the laminates. The material comes in various grades of viscosities and a thicker viscosity material is chosen for bonding the laminates in order to prevent the material from running out of the laminations. The material is placed between the laminates and the laminates are pressed together and cured close to the operating temperature to create a bond. The windings are then pressed and set within the slots in the laminates. A small amount of the same material is then formed over the windings and the entire structure is cured.

A critical factor is that the curing of the instrument must be done at or near the working temperature of the instrument. The impregnating material is chosen on the basis of this fact also. An analogy may serve to explain the significance of this feature. If one were to take several articles in a room, all of which are at the same temperature, and glue them together, there will be little inducement for them to break apart even though the materials are thermally incompatible. For example, one could glue a metal cabinet to a wood desk and then glue the whole combination to plaster walls, etc. But since all of the materials are at the same temperature, there are no built-in stresses and no inducement to break apart. However, if the temperature of any of the articles is raised just 10 or 20° F. or, conversely, if the combination is cured at an elevated temperature, and then put back into the room there will be a tendency to crack and separate. This is because the heating of each dissimilar element changes the characteristics of the elements differently so that when the composition is returned to room temperatures, there will be built-in stresses. Therefore, in building a low stress motor it is important that the composite be cured near the working temperature of the instrument.

Results obtained from a motor built in accordance with the present invention are shown as curve B in FIG. 4. Curve B shows the amount of trend as a function of time of an instrument built with an impregnating material according to the present invention. For the first time, the amount of time that it takes for the instrument to settle to an acceptable level of stability can be measured in days instead of months. Curve B is greatly reduced with respect to Curve A. The amount of trend for the first few hours falls off drastically, and then almost completely shuts off. In 75% of the cases tested, zero trend was measured. It should be noted that the trend is not absolutely zero, but it is so low that it cannot be measured with present test equipment.

Other test results made on instruments built in accordance with the present invention have shown remarkable results. Previously, in the case of high precision gyroscopes, if one was in storage for several months and was then put into use, it would typically take at least 3–5 days for the shifting of the components to settle to a formerly acceptable level of trend. With a gyroscope incorporating a motor built in accordance with the present invention, it can be calibrated and in drift in the system within 24 hours due to the motor's ability to stabilize to a new acceptable level which was heretofore unobtainable. This has resulted in a great lowering of costs since the time to complete drift has been significantly reduced, typically by a factor of 5 to 1.

Another factor which has been found to contribute to the low stresses of the motor is the keeping of the amount of impregnating material down to a minimum. In the past, typical motors for gyros used about 30 grams of filler and molding to impregnate the motor structure. Now, by cutting down this amount to approximately 4 grams, improved results have been noticed. By using a smaller amount of filler, the wires are left open to the air to a greater extent such that heat is more easily radiated. In other words, instead of molding the impregnating material, the windings are now merely wetted in place. For example, one technique for doing this is as follows. The impregnating materials are mixed and beat together in a container. There's usually a lot of air entrapped in the material and the normal degassing technique is to put the whole mass under a vacuum in a bell jar. The winding structure is then suspended slightly above the top of the mixture. When the vacuum is applied to the bell jar, the air expands and starts to bubble through the mixture. In this process, the level of the mixture is raised because it is a viscous material. As a result, the winding structure is submerged by the material bubbling over the top. Then, by immediately breaking the vacuum, the air rushing into the bell jar forces the mixture back to its original level off of the windings. By doing this several times, a small amount of impregnating material seeps in and around the windings. The entire structure is then cured at the working temperature of the instrument and a low stress compliant structure results.

As stated previously, the key factor in the low compliance motor is the use of a low modulus of elasticity material which is curable at the working temperature of the instrument. Many materials fall within this category and accordingly may be used. Several low modulus polyamide resin-epoxy mixtures have been tried and found to work successfully. One such mixture which has been employed is Versamid 140, which is made by Dow-Corning, mixed with Epon 828 made by the Shell Company. These are mixtures of resins and epoxy and can be purchased with various viscosities.

In summary, what has been done is to create an impregnate element in which the impregnating material has an ability to assume a compatible relationship with many dissimilar materials. Substantially the same structures are taken, which essentially consist of laminated core structures and windings, a minimum amount of low modulus bonding material is used, and the entire structure is cured at the working temperature of the instrument. The entire resulting system is low stressed. The same impregnating material which is used to impregnate the windings is used to bond the laminations. The only difference is that a high viscosity material is used for bonding the laminations so that the material will not run out of the laminations whereas a low viscosity material is used to impregnate the windings since its free flow is necessary.

Although the present invention has been described as applying to a motor structure and more particularly to a motor for use with a gyroscope, it should be understood that the teachings of the present invention are applicable to any composite structure where there is a mixture of coefficients of expansion and where minimum stresses for maximum stability is required. For example, the present invention is applicable to transformers, synchro-type devices, E-core pickoffs, resolvers, null indicating devices where low stress levels for obtaining a precise null is required and the entire family of electrical laminated structures.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiments but only by the scope of the appended claims.

We claim:
1. The method of bonding laminates of stator cores and impregnating stator windings of precision instruments to provide a relatively rapid adjustment to a dimensionally stable condition in the order of 24 hours or less from environmental temperatures to operating temperatures of the instruments comprising:
   providing a liquid adhesive material of epoxy-polyamide mixture devoid of filler material and having a low modulus of elasticity of substantially less than $12 \times 10^{-5}$ p.s.i;
   coating said laminates with said liquid adhesive material mixture and pressing the laminates together to form a laminated stator core structure for receiving said stator windings;
   disposing stator windings on the laminated structure;
   suspending the stator with windings in an open-ended enclosure for vacuum drawing said epoxy-polyamide mixture;
   vacuum drawing said mixture into said enclosure and over said stator windings to cause the mixture to impregnate said stator windings;
   removing excess of said mixture from said windings to retain only a thin coating thereof on said winding;
   curing the epoxy-polyamide mixture at approximately the operating temperature of the instrument to produce a bonding of said stator structure by said epoxy-polyamide mixture.

2. The method of claim 1 in which said laminated core structure is cured at approximately the operating temperature before the stator windings are disposed on said core structure.

3. The method of claim 1 in which the vacuum drawing of the mixture causes release of air from the mixture and flow of the mixture over the stator windings.

4. In a gyroscope, stator means for driving the rotor thereof comprising:
   a laminated stator cone having slots for receiving stator windings;
   laminates for said stator core;
   stator windings disposed on said core and in said slots;
   an adhesive material securing laminates of said stator core and impregnating said stator windings, said adhesive material comprising an epoxy-polyamide mixture devoid of filler material and having a low modulus of elasticity of substantially less than $12 \times 10^{-5}$ p.s.i. to provide for mass shifting of laminates and windings forming said stator within a time period on the order of 24 hours or less from initiating operation in order to provide stable operation in the range of operating temperatures after said time period.

References Cited

UNITED STATES PATENTS

| | | | |
|---|---|---|---|
| 2,838,703 | 6/1958 | Balke | 310—217 |
| 2,846,599 | 8/1958 | McAdam | 310—43 |
| 2,961,555 | 11/1960 | Towne | 310—43 |
| 3,164,488 | 1/1965 | Workman | 117—75 |
| 3,336,415 | 8/1967 | Kennedy. | |
| 3,406,053 | 10/1968 | Jaenicke. | |
| 3,408,734 | 11/1968 | Leahy et al. | 29—596 |
| 3,436,815 | 4/1969 | Sheets | 29—605 |

OTHER REFERENCES

Lee et al., Epoxy Resins, McGraw-Hill, New York, 1957 (TP 968 E 614), pp. 166–172.

WARREN E. RAY, Primary Examiner

U.S. Cl. X.R.

29—596; 156—330; 310—217